United States Patent
Altintas et al.

(10) Patent No.: US 8,594,666 B2
(45) Date of Patent: Nov. 26, 2013

(54) UNUSED FREQUENCY BAND DETECTION METHOD AND RADIO COMMUNICATION APPARATUS IN COGNITIVE RADIO SYSTEM

(75) Inventors: Onur Altintas, Tokyo (JP); Yuji Oie, Kitakyushu (JP); Masato Tsuru, Kitakyushu (JP); Kazuya Tsukamoto, Kitakyushu (JP)

(73) Assignees: Toyota Infotechnology Center Co., Ltd., Tokyo (JP); Kyushu Institute of Technology, Fukuoka (JP)

( * ) Notice: Subject to any disclaimer, the term of this patent is extended or adjusted under 35 U.S.C. 154(b) by 101 days.

(21) Appl. No.: 13/121,589

(22) PCT Filed: Dec. 7, 2009

(86) PCT No.: PCT/JP2009/070481
§ 371 (c)(1),
(2), (4) Date: Mar. 29, 2011

(87) PCT Pub. No.: WO2010/067777
PCT Pub. Date: Jun. 17, 2010

(65) Prior Publication Data
US 2011/0223936 A1 Sep. 15, 2011

(30) Foreign Application Priority Data
Dec. 8, 2008 (JP) .................................. 2008-312544

(51) Int. Cl.
*H04W 4/00* (2009.01)
(52) U.S. Cl.
USPC ...... 455/434; 455/447; 455/435.1; 455/456.1
(58) Field of Classification Search
USPC ........................ 455/434, 456.1–456.6, 447, 455/435.1–435.3
See application file for complete search history.

(56) References Cited

U.S. PATENT DOCUMENTS

| | | | | |
|---|---|---|---|---|
| 6,484,029 | B2* | 11/2002 | Hughes et al. | 455/434 |
| 2002/0090965 | A1* | 7/2002 | Chen et al. | 455/522 |

(Continued)

FOREIGN PATENT DOCUMENTS

| | | |
|---|---|---|
| JP | 2006-094005 | 4/2006 |
| JP | 2006-304310 | 11/2006 |
| JP | 2007-088940 | 4/2007 |
| JP | 2008-153858 | 7/2008 |
| WO | WO 2006/047572 A1 | 5/2006 |

OTHER PUBLICATIONS

International Search Report for International Application No. PCT/JP2009/070481, mailed Mar. 9, 2010; 2 pages.

*Primary Examiner* — Steven Lim
(74) *Attorney, Agent, or Firm* — Alston & Bird LLP

(57) ABSTRACT

Provided is a technique that enables quicker detection of usable frequency bands in a cognitive radio system. Each radio communication apparatus in the system has, in common, a hash function used to obtain a frequency range from time information and location information. Each radio communication apparatus detects unused frequency bands while narrowing down a frequency range over which a detection process is performed by obtaining the terminal's own location information and current time information from GPS signals, and input them to the hash function. Since a transmitting node and a receiving node that perform a communication are at locations close to each other at the same time, they perform detection in the same frequency range. Therefore, an unused frequency band(s) that is usable by both of them can be detected. Furthermore, at different locations or at different times, the detection will be performed in different frequency ranges. Therefore efficient frequency utilization can be achieved. It is preferred that the nodes have a plurality of kinds of hash functions in common.

8 Claims, 4 Drawing Sheets

(56) References Cited

U.S. PATENT DOCUMENTS

| | | |
|---|---|---|
| 2005/0164701 A1* | 7/2005 | Karabinis et al. ............ 455/428 |
| 2006/0281404 A1* | 12/2006 | Lee et al. .................... 455/11.1 |
| 2007/0091720 A1 | 4/2007 | Woo et al. |
| 2007/0092045 A1 | 4/2007 | Woo et al. |
| 2008/0080604 A1 | 4/2008 | Hur et al. |
| 2008/0101284 A1 | 5/2008 | Buchwald et al. |
| 2008/0108366 A1 | 5/2008 | Hu |

* cited by examiner

UNUSED FREQUENCY BAND DETECTION METHOD AND RADIO COMMUNICATION APPARATUS IN COGNITIVE RADIO SYSTEM

CROSS REFERENCE TO RELATED APPLICATION

This application is the national phase application under 35 U.S.C. §371 of PCT international application No. PCT/JP2009/070481 filed on Dec. 7, 2009, which claims priority to Japanese patent application No. 2008-312544 filed on Dec. 8, 2008, the contents of which are incorporated herein by reference.

TECHNICAL FIELD

The present invention relates to a technique of detecting unused frequency bands in a cognitive radio system.

BACKGROUND ART

In recent years, cognitive radio systems that detect and use an unused frequency band have been studied and developed. Usable frequency bands change with time and location due to communications by primary users, the mobility of terminals, or other reasons. Therefore, spectrum sensing for detecting unused frequency bands is one of the key techniques in cognitive radio systems.

As unused frequency band detection methods, there have been known methods disclosed in patent literatures 1 to 5. Patent literature 1 describes a technique in which base stations using TV frequency bands according to e.g. IEEE 802.22 sense unused frequency bands in cooperation. Patent Literature 2 describes a plurality of nodes that scan respective predetermined portions of spectrum and share the scan results among them. Patent Literatures 3 to 5 describe performing a first coarse scanning over all the frequency bands and performing a second scanning with high accuracy based on the result.

CITATION LIST

Patent Literature

Patent Literature 1: Published United States Patent Application No. 2008/0108366
Patent Literature 2: Published United States Patent Application No. 2008/0101284
Patent Literature 3: Published United States Patent Application No. 2008/0080604
Patent Literature 4: Published United States Patent Application No. 2007/0092045
Patent Literature 5: Published United States Patent Application No. 2007/0091720

SUMMARY OF THE INVENTION

Technical Problem

It is expected that target frequency bands to be used in the cognitive radio will become increasingly widespread in the feature. It is contemplated, for example, that the target bands may spread over a wide frequency range of several MHz to several tens GHz or higher. At present, it takes several tens of seconds to scan a range of several hundred MHz to 5 GHz. In addition, in the case of, for example, a rapidly moving vehicle, it is relatively highly necessary to determine a frequency band to be used quickly.

In view of the above, an object of the present invention is to provide a technique that enables quicker detection of usable frequency bands in a cognitive radio system.

Solution to Problem

According to the present invention, to achieve the above object, detection of unused frequency bands is performed by the following means or processing.

The unused frequency band detection method in a cognitive radio system according to the present invention is characterized in that each radio communication apparatus narrows down the frequency range over which detection is to be performed using location information and time information. By narrowing down the detection range, scanning can be performed more quickly. Since the frequency range over which detection is to be performed is narrowed down using location information and time information according to a predetermined rule in each radio communication apparatus, radio communication apparatuses located at the same location at the same time will scan the common frequency range, and the frequency band to be used for communication can be determined.

In the present invention, more specifically, it is preferred that each of the radio communication apparatuses that constitute the cognitive radio system have in common, as the aforementioned common rule, a hash function used to obtain a frequency range based on the time information and location information. By using the hash function, a value (or hash value) dependent on the time information and location information can be obtained. Therefore, if correspondence between hash values and frequency ranges has been established, a frequency range can be obtained from the location information, time information, and hash function.

In the present invention, it is preferred that a radio communication apparatus having such a common hash function executes a position information obtaining step of obtaining terminal's own location information, a time information obtaining step of obtaining current time, a detection range limiting step of narrowing down the frequency range over which the detection process is to be performed, using the obtained location information, the obtained time information, and the hash function, and a detection step of performing detection of unused frequency bands in the narrowed-down frequency range.

Since the frequency range over which the detection process is to be performed is narrowed down by the hash function using location information and time information, the process of detecting unused frequency bands can be completed more quickly than in the case where the radio communication apparatus scans all the frequency bands in which the radio communication apparatus is operable. Then, as long as the location and time are the same, the same frequency range will be scanned, and radio communication apparatuses located close to each other can determine a frequency band used for cognitive radio. At different locations or at different times, different frequency ranges will be separately scanned basically. Therefore, frequency bands being used will be dispersed, and efficient frequency utilization can be achieved.

In the present invention it is preferred that the location information and the time information be obtained from a GPS signal. Since the GPS signal contains both the location information and the time information, obtaining them from a GPS signal enables a simplification of the configuration of the apparatus, and eliminates problems in synchronization.

In the present invention, it is preferred that the location information assume the same value in an area having a specific size. Since the hash function provides different frequency ranges from different values of location information, it is preferred that the location information assume the same value in a certain size of area in order for radio communication apparatuses close to each other to be able to communication with each other. It is preferred that the size of the area be dependent on the communication distance of radio communication.

It is also preferred in the present invention that the radio communication apparatuses have a plurality of kinds of hash functions. In addition, it is preferred that a plurality of frequencies obtained using the plurality of kinds of hash functions be scanned. If this is the case, when a certain frequency range is unusable, the scanning range can be changed quickly.

The present invention may be viewed as an unused frequency band detection method in which at least one or some of the above described processes are executed or as a program for implementing this method. The present invention may also be viewed as a radio communication apparatus that detects unused frequency bands by executing the above-described processes. The above-described means and processes may be adopted in combination, where feasible, to constitute the present invention.

Advantageous Effect of Invention

According to the present invention, usable frequency bands can be detected quickly in a cognitive radio system.

DESCRIPTION OF EMBODIMENTS

In the following, preferred embodiments of the present invention will be described in detail by way of example.

First Embodiment

A cognitive radio communication system according to this embodiment is composed of a plurality of radio communication apparatuses. The radio communication apparatuses are mounted on vehicles and constitute an inter-vehicle-communication radio network. Communications between these terminals are performed while sensing the surrounding radio condition and dynamically changing the frequency band (or frequency channel) being used. This radio communication system is an ad hoc network in which radio communication apparatuses are interconnected without the aid of infrastructures such as access points. Therefore, there is no control apparatus that assigns frequency bands to be used for communications.

Figure 1:
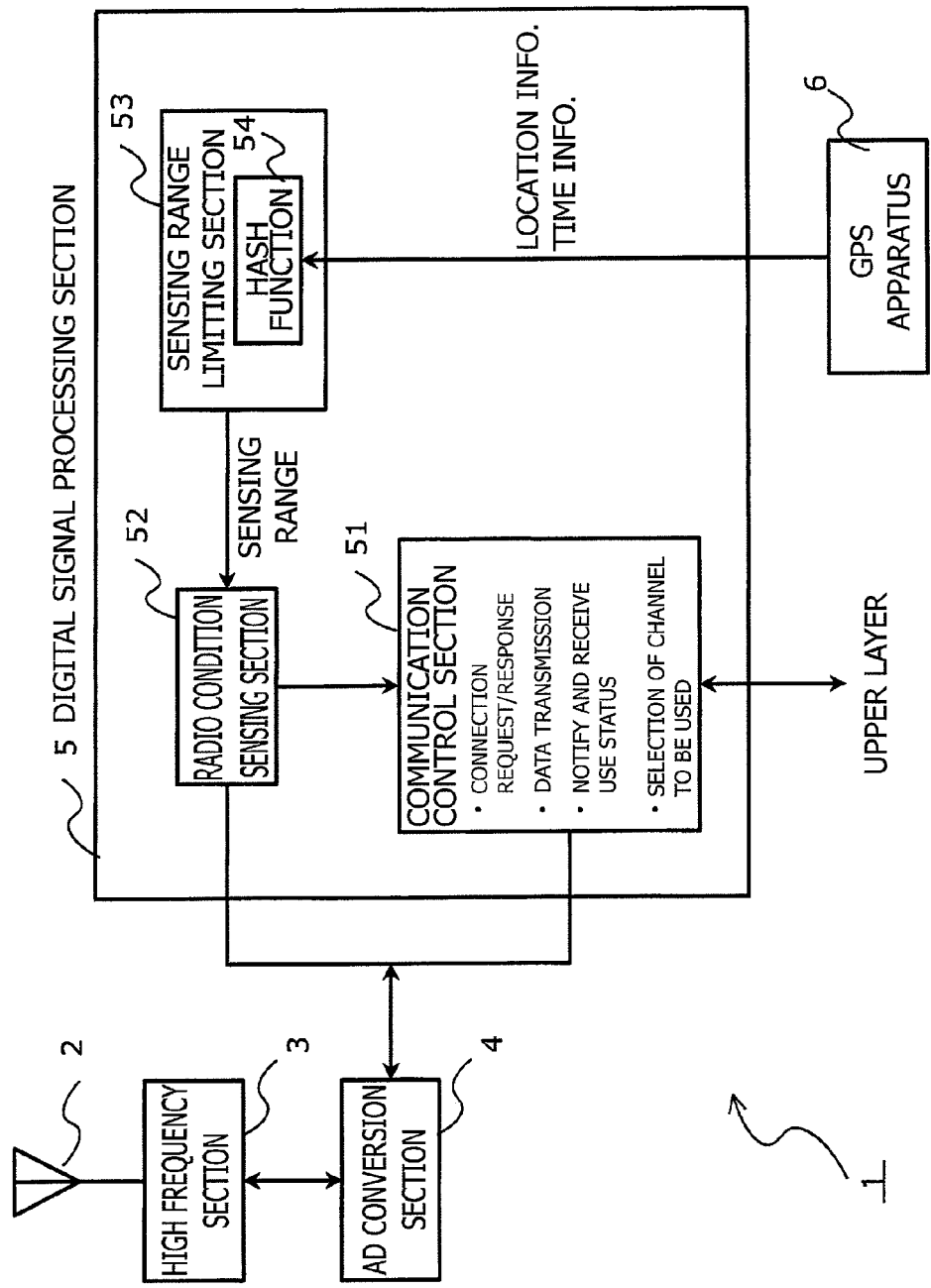
FIG. 1 is a diagram showing functional blocks of a radio communication apparatus in a cognitive radio system according to an embodiment.

FIG. 1 is a schematic diagram showing the functional configuration of a radio communication apparatus that constitutes the cognitive radio communication system according to this embodiment. The radio communication apparatus 1 has an antenna 2, a high frequency section 3, an AD conversion section 4, a digital signal processing section 5, and a GPS apparatus 6. The high frequency section 3 receives radio signals and converts them into signals in a frequency band in which digital signal processing can easily be applied. The high frequency section 3 also converts signals to be transmitted into signals having a frequency for actual transmission. The AD conversion section 4 converts received analogue signals into digital signals, and converts digital signals to be transmitted into analogue signals. In the radio communication apparatus 1, signals over a wide band (e.g. 900 MHz-5 GHz) received through the antenna 2 are AD-converted all together, and processing such as demodulation, including channel selection, is performed by the digital signal processing section 5.

The digital signal processing section 5 may be composed of a DSP (Digital Signal Processor), an FPGA (Field Programmable Gate Array), and a dynamic reconfigurable processor etc. The digital signal processing section 5 includes, as functional sections, a communication control section 51, a radio condition sensing section 52, and a sensing range limiting section 53. Although the digital signal processing section 5 further has functional sections such as one for modulation/demodulation, detailed description thereof will be omitted because they have already been well known.

The communication control section 51 performs the process of establishing a connection, the processing of transmitting and receiving data, the processing of informing the party at the other end of communication of the use status of channels, and the processing of selecting a channel to be used.

The radio condition sensing section 52 senses the radio condition around the node's own surrounding to determine whether each frequency band is used or unused (in other words, whether or not each frequency band is available for use by the node). As specific sensing techniques, various known methods may be employed. The radio condition sensing section 52 determines whether or not frequency bands are used or unused by energy detection, wavelet decomposition technique, pilot based spectrum sensing, eigenvalue based spectrum sensing, feature detection, matched filter method etc, in accordance with the radio communication scheme to be sensed.

The sensing range limiting section 53 computes the frequency range over which detection of unused frequencies by the radio condition sensing section 52 is to be performed. The sensing range limiting section 53 inputs current location information and time information obtained through the GPS apparatus 6 to a hash function 54 to determine the frequency range over which sensing is sensing is to be performed. All the radio communication apparatuses in this cognitive radio communication system use the same hash function 54.

Figure 2:
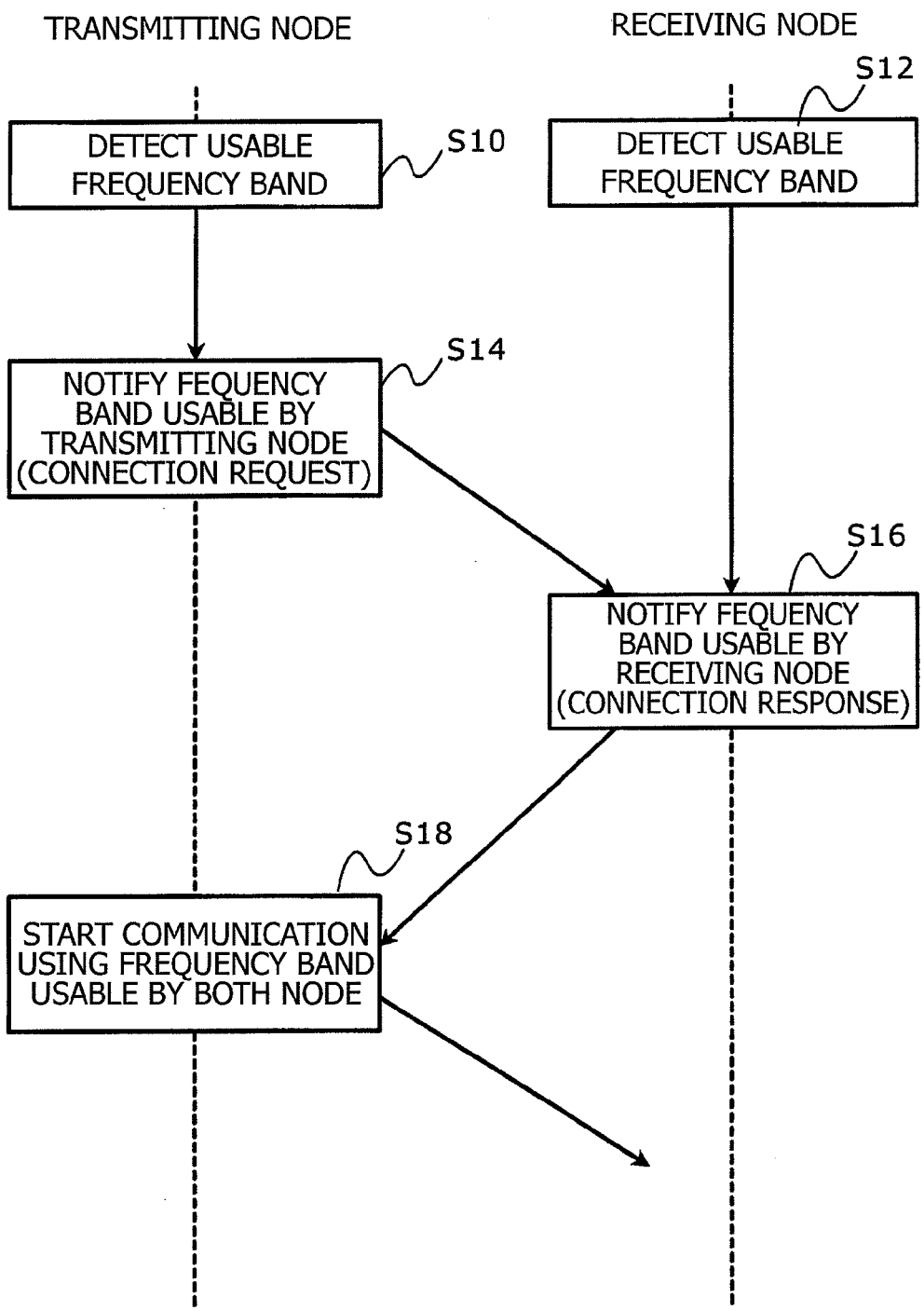
FIG. 2 is a flow chart showing the flow of processes performed in a transmitting node and a receiving node at the time of establishing a communication.

In the following, the process for establishing a communication will be described briefly with reference to FIG. 2. Firstly, each of a transmitting node and a receiving node detects usable frequency bands (or frequency channels) by the radio wave sensing section 52 (S10, S12). The transmitting node transmits a connection request to the party at the other end of the communication (i.e. the receiving node) while informing the party at the other end of the frequency channels usable by the transmitting node (S14). The receiving node is waiting for receiving radio waves in frequency bands usable thereby. Upon receiving the connection request, the receiving node transmits a response to the connection request while notifying the transmitting node of frequency bands that are usable at least by itself (i.e. the receiving node) and the transmitting node (S16). After receiving the connection response from the receiving node, the transmitting node starts communication using a frequency channel usable by both the nodes.

Figure 3:
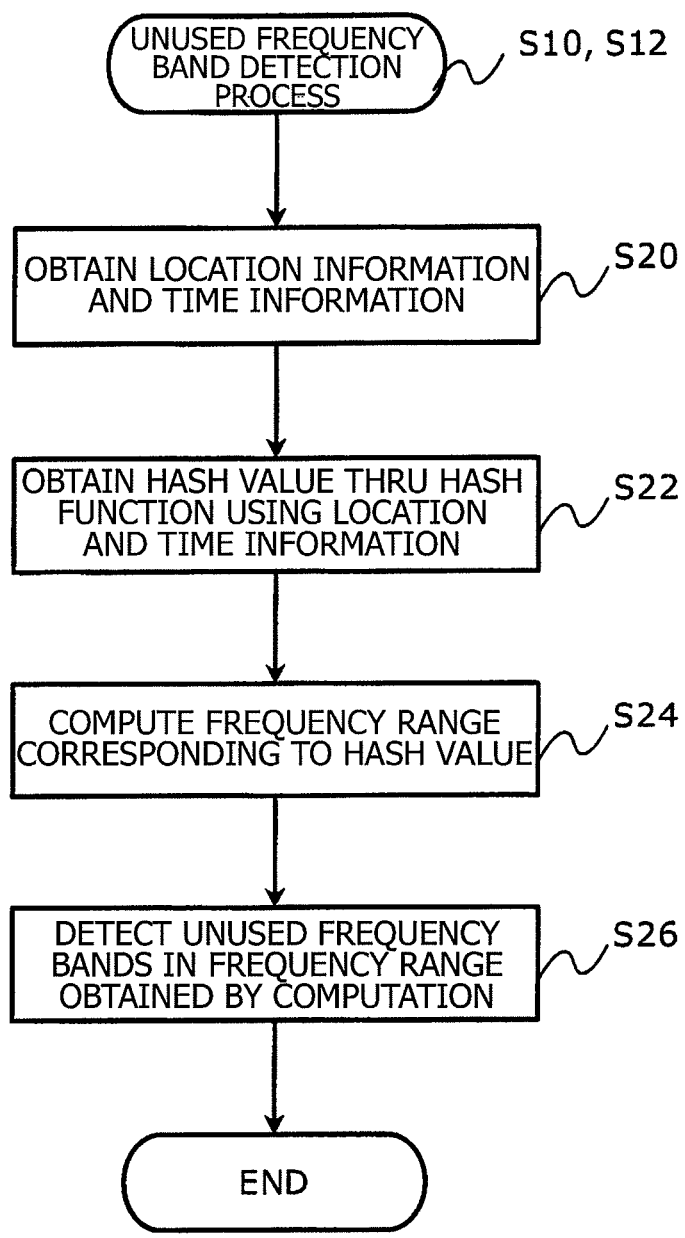
FIG. 3 is a flow chart showing the flow of an unused frequency band detection process.

Now, the process of detecting usable frequency bands in steps S10 and S12 will be described with reference to FIG. 3.

Each node obtains current location information and current time information through the GPS apparatus 6 (S20). Then, the location information and the time information are input to the hash function 54 as keys to compute a hash value (S22).

It is necessary that the location information input to the hash function 54 be of the same value so that nodes at locations close to each other can scan the same frequency range. Therefore, a map is segmented into areas having a certain size, and an area ID is used as the location information input to the hash function. It is preferable that the size of each area be set in accordance with the communication distance. For example, each area may be square with sides of fifty meters. It is not necessary that all the area be uniform in size, but the areas may have sizes different from one another. As the location information input to the hash function 54, longitude and latitude information rounded to the nearest ten seconds may be used instead of the area ID.

If the frequency range is determined based only on the location information, many nodes will obtain the same hash value (i.e. the same scanning frequency range) when they are at locations close to each other. In view of this, the time information is also input to the hash function, whereby the hash values are dispersed in accordance with the time at which the communication is started.

Next, the frequency range determination section 53 determines the frequency range corresponding to the obtained hash value (S24). The correspondence between hash values and frequency ranges may be established in any way. The simplest implementation is limiting the frequency range by H and H+$\Delta$f, where H is the obtained hash value, and $\Delta$f is a predetermined frequency width.

Then, the radio condition sensing section 52 performs the process of detecting unused frequency bands over the frequency range determined as above.

Figure 4:
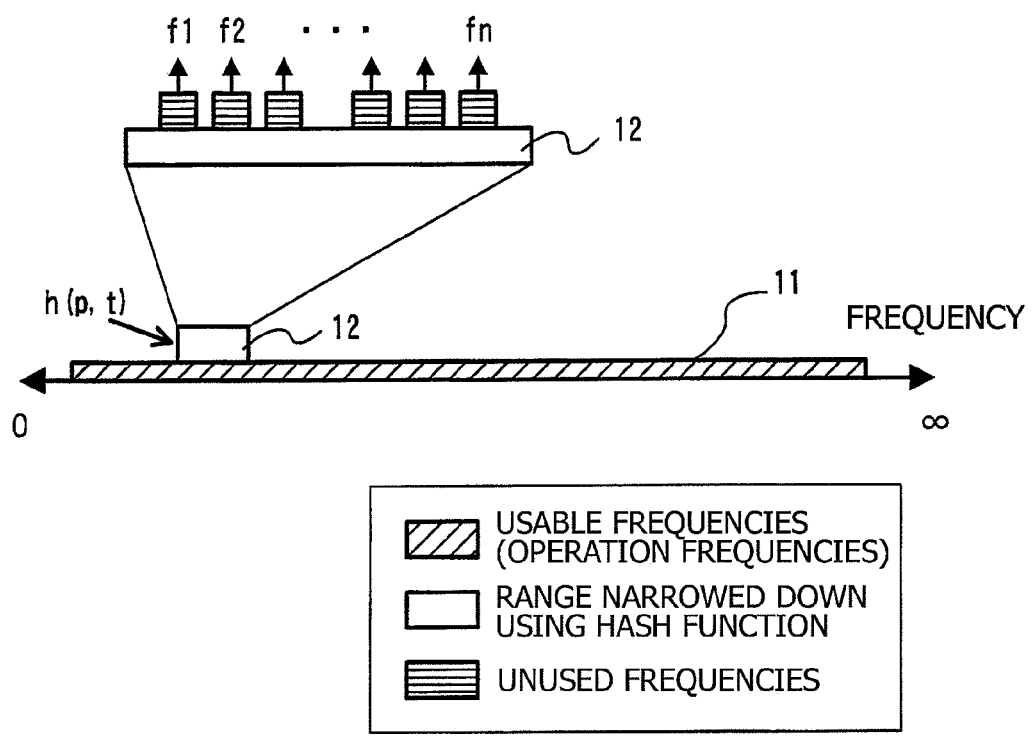
FIG. 4 is a diagram illustrating the narrowing-down of a detection range using a hash function.

With the process of detecting unused frequency bands, the frequency band to be scanned can be narrowed down. While the frequency range 11 over which the radio communication apparatus can operate (which is referred to as the operating frequency range) ranges vary widely from several hundred MHz to several GHz as shown in FIG. 4, the range to be scanned is limited to range 12 by using the hash function. Unused frequencies f1, f2, ..., fn are detected in this limited range 12. Thus, since only a partial frequency range in the very wide frequency range is scanned, the time taken in scanning can be greatly reduced.

In the case discussed herein, the transmitting and receiving nodes that perform communication with each other are at locations close to each other at the same time. Therefore, they will obtain the same scanning range from the hash function, and they can detect unused frequency bands in the same frequency range. In contrast, vehicles located remote from each other will scan different frequency ranges, and communicate using frequency bands in the respective range. Therefore, frequency bands being used can be dispersed, and efficient frequency utilization can be achieved. In cases where many nodes are located within a close range, they will use different frequency ranges if the timings of starting communication are different, and therefore efficient frequency utilization can be achieved in this case also.

The process (steps S14 and S16 in FIG. 2) of communicating usable frequency bands detected by the transmitting and receiving nodes as described above to each other may be implemented in various manners. An example thereof will be described herein.

Firstly, the transmitting node that attempts to start a communication transmits a connection request in all the frequency bands that have been detected to be usable by itself. Upon receiving the connection request in some frequency band(s), the receiving node transmits a connection response in reply to the connection request in all the frequency bands that have been detected to be usable by itself. Since the transmitting node may conclude that the frequency bands in which the connection response have been received are usable by both the nodes, it performs a communication using one, some, or all of such frequency bands from then on.

The process of communicating usable frequency bands to each other may be implemented by methods other than the method described above. For example, the transmitting node may transmit connection requests using some (including one) of the frequency bands usable by itself, and information on the frequency bands usable by itself may be contained in the connection requests. Then, if the receiving node receives at least one connection request, it can recognize the frequencies usable by the transmitting node. The receiving node may transmit ACKs using some (including one) of the frequencies at which it has received the connection requests, and information on the frequencies usable by itself may be contained in the ACK. Then, if the transmitting node receives at least one ACK, it can recognize the frequencies usable by the receiving node.

Even after the establishment of the communication, the surrounding radio condition changes with the movement of the transmitting node and/or the receiving nodes and with the lapse of time. In view of this, the transmitting node and the receiving node scan the respective radio conditions around themselves at regular time intervals even during communication, and communicate the frequency bands usable by themselves to each other. In this regular scanning also, only a partial frequency range is scanned using the hash function as described above. In the case where, for example, a primary user starts a communication in the frequency band that they are presently using for communication, they switches the frequency band to another frequency band that is usable by both the nodes to continue the communication.

In the cognitive radio system according to this embodiment, since the frequency range to be scanned is narrowed down by inputting location information and time information to the hash function, the scanning of unused frequency bands can be completed quickly. In consequence, real time sensing can be performed even in an environment, like that in the vehicle network, in which the surrounding radio condition changes rapidly and it is necessary that the frequency band to be used be determined in a short time.

Second Embodiment

While in the first embodiment the sensing range limiting section 53 has only one hash function 54, in this embodiment a plurality of kinds of (e.g. three) hash functions 54 are used. Thus, a plurality of possible scanning ranges can be prepared, and the scanning can be performed quickly even at a time when the frequency utilization rate is high.

Specifically, the scanning range can be extended by performing the scanning over the respective ranges obtained from the plurality of hash functions. Therefore, usable frequency bands can be detected quickly even at a time when the frequency utilization rate is high.

REFERENCE SIGN LIST

1: radio communication apparatus
5: digital signal processing section
6: GPS apparatus
51: communication control section
52: radio condition sensing section
53: sensing range limiting section
54: hash function

The invention claimed is:

1. An unused frequency band detection method in an ad hoc cognitive radio system wherein each of a plurality of autonomous radio communication apparatuses has a hash function used to obtain a frequency range from time information and location information in common, and wherein each radio communication apparatus executes:
 a position information obtaining step of obtaining the radio communication apparatus's own location information;
 a time information obtaining step of obtaining current time information;
 a detection range limiting step of inputting the obtained location information and time information into the hash function to calculate a hash value, and narrowing a detection frequency range down to a predetermined frequency range including a frequency corresponding to the calculated hash value; and
 a detection step of performing detection of unused frequency bands in said narrowed-down frequency range.

2. An unused frequency band detection method according to claim 1, wherein said location information and said time information are obtained from a GPS signal.

3. An unused frequency band detection method according to claim 1, wherein said location information assumes a same value in an area having a specific size.

4. An unused frequency band detection method according to claim 1, wherein each radio communication apparatus has a plurality of kinds of said common hash functions, and in said frequency range limiting step, the target frequency range is narrowed down to frequency ranges respectively obtained from the plurality of hash functions.

5. A radio communication apparatus in an ad hoc cognitive radio system, comprising:
 a memory unit adapted to store a hash function used to obtain a frequency range from time information and location information, the hash function being common in said cognitive radio system;
 a location information obtaining unit adapted to obtain the radio communication apparatus's own location information;
 a time information obtaining unit adapted to obtain current time information;
 an unused frequency band detection unit adapted to detect unused frequency bands by inputting the obtained location information and time information into the hash function to calculate a hash value, and narrowing a detection frequency range down to a predetermined frequency range including a frequency corresponding to the calculated hash value, over which predetermined frequency range a detection process is to be performed.

6. A radio communication apparatus according to claim 5, wherein said location information obtaining unit and said time information obtaining unit comprise a GPS apparatus.

7. A radio communication apparatus according to claim 5, wherein said location information assumes a same value in an area having a specific size.

8. A radio communication apparatus according to claim 5, wherein a plurality of kinds of hash functions that are common in said cognitive radio system are stored in said memory unit, and said unused frequency band detection unit performs the detection process in frequency ranges respectively obtained from the plurality of hash functions.

* * * * *